United States Patent
Eastep et al.

(10) Patent No.: US 12,122,887 B2
(45) Date of Patent: Oct. 22, 2024

(54) FIBER-REINFORCED PROPYLENE POLYMER COMPOSITION

(71) Applicant: Ticona LLC, Florence, KY (US)

(72) Inventors: David W. Eastep, Winona, MN (US); Aaron H. Johnson, Winona, MN (US)

(73) Assignee: Ticona LLC, Florence, KY (US)

( * ) Notice: Subject to any disclaimer, the term of this patent is extended or adjusted under 35 U.S.C. 154(b) by 101 days.

(21) Appl. No.: 17/543,803

(22) Filed: Dec. 7, 2021

(65) Prior Publication Data

US 2022/0195132 A1 Jun. 23, 2022

Related U.S. Application Data

(60) Provisional application No. 63/171,608, filed on Apr. 7, 2021, provisional application No. 63/126,602, filed on Dec. 17, 2020.

(51) Int. Cl.
*C08J 5/04* (2006.01)
*C08K 5/00* (2006.01)
(Continued)

(52) U.S. Cl.
CPC .............. *C08J 5/043* (2013.01); *C08K 5/005* (2013.01); *C08K 5/0066* (2013.01);
(Continued)

(58) Field of Classification Search
CPC ....... C08J 5/043; C08J 2323/12; C08K 5/005; C08K 5/0066; C08K 5/34922;
(Continued)

(56) References Cited

U.S. PATENT DOCUMENTS

RE32,772 E    10/1988 Hawley
6,365,071 B1   4/2002 Jenewein et al.
(Continued)

FOREIGN PATENT DOCUMENTS

CN    109401300 A    3/2019
EP    1 544 240 A1   6/2005
(Continued)

OTHER PUBLICATIONS

Liu et al., "An efficiently halogen-free flame-retardant long-glass-fiber-reinforced polypropylene system," *Polymer Degradation and Stability*, vol. 96, (2011) pp. 363-370.
(Continued)

*Primary Examiner* — Ling Siu Cho
*Assistant Examiner* — Ronald Grinsted
(74) *Attorney, Agent, or Firm* — Dority & Manning, P.A.

(57) ABSTRACT

A fiber-reinforced polymer composition comprising from about 60 wt. % to about 90 wt. % of a polymer matrix that contains a propylene polymer and from about 10 wt. % to about 40 wt. % of a plurality of long reinforcing fibers that are distributed within the polymer matrix, is provided. The polymer composition exhibits a dielectric constant of about 4 or less and dissipation factor of about 0.01 or less at a frequency of 2 GHz. Further, the polymer composition exhibits a Charpy unnotched impact strength of about 20 kJ/m$^2$ or more as determined in accordance with ISO Test No. 179-1:2010 at a temperature of about 23° C., and a Limiting Oxygen Index of about 25 or more as determined in accordance with ISO 4589:2017.

27 Claims, 4 Drawing Sheets

(51) Int. Cl.
  *C08K 5/34* (2006.01)
  *C08K 5/3492* (2006.01)
  *C08K 5/53* (2006.01)
  *C08K 5/5313* (2006.01)
  *C08K 7/14* (2006.01)
  *C08L 23/12* (2006.01)

(52) U.S. Cl.
  CPC ........ C08K 5/34922 (2013.01); C08K 5/5313 (2013.01); C08K 7/14 (2013.01); C08L 23/12 (2013.01); *C08J 2323/12* (2013.01); *C08K 2201/004* (2013.01); *C08K 2201/019* (2013.01); *C08L 2201/02* (2013.01); *C08L 2203/206* (2013.01)

(58) Field of Classification Search
  CPC .. C08K 5/5313; C08K 7/14; C08K 2201/004; C08K 2201/019; C08L 23/12; C08L 2201/02; C08L 2203/206
  USPC .......................................................... 524/68
  See application file for complete search history.

(56) References Cited

U.S. PATENT DOCUMENTS

| | | | |
|---|---|---|---|
| 7,052,630 | B2 | 5/2006 | Yang et al. |
| 7,255,814 | B2 | 8/2007 | Hoerold et al. |
| 7,259,200 | B2 | 8/2007 | Bauer et al. |
| 7,417,083 | B2 | 8/2008 | Kosaka et al. |
| 7,455,901 | B2 | 11/2008 | Yano et al. |
| 7,648,758 | B2 | 1/2010 | Morin |
| 7,737,198 | B2 | 6/2010 | Murouchi et al. |
| 7,803,856 | B2 | 9/2010 | Perego et al. |
| 8,445,593 | B2 | 5/2013 | Ishii et al. |
| 8,710,124 | B2 | 4/2014 | Lo et al. |
| 8,859,089 | B2 | 10/2014 | Nelson et al. |
| 8,921,692 | B2 | 12/2014 | Nelson et al. |
| 8,987,359 | B2 | 3/2015 | Kang et al. |
| 9,096,000 | B2 | 8/2015 | Maliszewski et al. |
| 9,190,184 | B2 | 11/2015 | Nelson et al. |
| 9,233,486 | B2 | 1/2016 | Regan et al. |
| 9,238,347 | B2 | 1/2016 | Nelson et al. |
| 9,278,472 | B2 | 3/2016 | Eastep et al. |
| 9,355,753 | B2 | 5/2016 | Kim |
| 9,394,483 | B2 | 7/2016 | Wu et al. |
| 9,409,347 | B2 | 8/2016 | Nelson et al. |
| 9,534,109 | B2 | 1/2017 | Hoerold et al. |
| 9,659,680 | B2 | 5/2017 | Nelson et al. |
| 9,919,481 | B2 | 3/2018 | Nelson et al. |
| 9,988,519 | B2 | 6/2018 | Kim |
| 10,062,889 | B2 | 8/2018 | Tanaka et al. |
| 10,202,549 | B2 | 2/2019 | Bauer et al. |
| 10,330,862 | B2 | 6/2019 | Rocosky et al. |
| 10,358,556 | B2 | 7/2019 | Luo et al. |
| 10,673,121 | B2 | 6/2020 | Hughes et al. |
| 10,676,845 | B2 | 6/2020 | Nelson et al. |
| 10,752,760 | B2 | 8/2020 | Haley et al. |
| 11,129,312 | B2 | 9/2021 | Grinsteinner |
| 11,401,416 | B2 | 8/2022 | Pasetti et al. |
| 11,466,130 | B2 | 10/2022 | Grinsteinner |
| 11,485,858 | B2 | 11/2022 | Sparks et al. |
| 2005/0154110 | A1 | 7/2005 | Takaya et al. |
| 2006/0089435 | A1 | 4/2006 | Hoerold et al. |
| 2007/0104925 | A1 | 5/2007 | Huber et al. |
| 2008/0300355 | A1 | 12/2008 | Kenny et al. |
| 2009/0048373 | A1 | 2/2009 | CLauss et al. |
| 2009/0054565 | A1 | 2/2009 | Eisentraeger et al. |
| 2010/0087573 | A1 | 4/2010 | Cartier et al. |
| 2014/0177155 | A1 | 6/2014 | Luo et al. |
| 2014/0371357 | A1 | 12/2014 | Hoekstra et al. |
| 2015/0084228 | A1 | 3/2015 | Nelson et al. |
| 2015/0094409 | A1 | 4/2015 | Kenny |
| 2015/0298400 | A1 | 11/2015 | Maliszewski et al. |
| 2016/0009918 | A1 | 1/2016 | Hoerold et al. |
| 2016/0245282 | A1 | 8/2016 | Haug |
| 2016/0248061 | A1 | 8/2016 | Brambrink et al. |
| 2021/0054190 | A1 | 2/2021 | Kim |
| 2021/0075093 | A1 | 3/2021 | Zhang et al. |
| 2021/0075162 | A1 | 3/2021 | Kim et al. |
| 2021/0143539 | A1 | 5/2021 | Yuan et al. |
| 2021/0403708 | A1 | 12/2021 | Eastep et al. |
| 2022/0195161 | A1 | 6/2022 | Eastep et al. |
| 2022/0200124 | A1 | 6/2022 | Eastep et al. |
| 2022/0363898 | A1 | 11/2022 | Pasetti et al. |

FOREIGN PATENT DOCUMENTS

| | | |
|---|---|---|
| JP | H 09227726 A | 9/1997 |
| JP | H 10310666 A | 11/1998 |
| JP | 2007063346 A | 3/2007 |
| JP | 2020069764 A | 5/2020 |
| WO | WO 2019/213920 A1 | 11/2019 |
| WO | WO 2020/173943 A1 | 9/2020 |

OTHER PUBLICATIONS

Material Safety Data Sheet for PFP042M-04 from NWP, Inc., Mar. 27, 2014, 9 pages.
Technical Data Sheet on Extinity® PFP042M-04 from SACO AEI Polymers, Mar. 22, 2016, 1 page.
International Search Report and Written Opinion for PCT/US2021/062171 dated Mar. 1, 2022, 11 pages.

FIBER-REINFORCED PROPYLENE POLYMER COMPOSITION

CROSS REFERENCE TO RELATED APPLICATIONS

The present application claims filing benefit of United States Provisional Patent Applications Ser. Nos. 63/126,602 having a filing date of Dec. 17, 2020 and 63/171,608 having a filing date of Apr. 7, 2021, which are incorporated herein by reference in their entirety.

BACKGROUND OF THE INVENTION

Electronic modules typically contain electronic components (e.g., printed circuit board, antenna elements, radio frequency devices, sensors, light sensing and/or transmitting elements (e.g., fibers optics), cameras, global positioning devices, etc.) that are received within a housing structure to protect them from weather, such as sunlight, wind, and moisture. Typically, such housings are formed from materials that allow the passage of electromagnetic signals (e.g., radiofrequency signals or light). While these materials are suitable in some applications, problems can nevertheless occur at higher frequency ranges, such as those associated with LTE or 5G systems. Various attempts have been made to employed fiber-reinforced materials in these applications to provide the requisite degree of strength. Unfortunately, most conventional fiber-reinforced materials exhibit a relatively high dissipation factor (loss tangent) and dielectric constant at high frequencies, which results in an unacceptable level of electromagnetic signal loss. Furthermore, attempts at improving the electrical loss properties can have an adverse impact on the flame resistance of the material, which is undesirable in most electrical applications. As such, a need currently exists for an improved materials for electronic modules.

SUMMARY OF THE INVENTION

In accordance with one embodiment of the present invention, a fiber-reinforced polymer composition is disclosed that comprises from about 60 wt. % to about 90 wt. % of a polymer matrix that contains a propylene polymer and from about 10 wt. % to about 40 wt. % of a plurality of long reinforcing fibers that are distributed within the polymer matrix. The polymer composition exhibits a dielectric constant of about 4 or less and dissipation factor of about 0.01 or less at a frequency of 2 GHz. Further, the polymer composition exhibits a Charpy unnotched impact strength of about 20 kJ/m$^2$ or more as determined in accordance with ISO Test No. 179-1:2010 at a temperature of about 23° C. and a Limiting Oxygen Index of about 25 or more as determined in accordance with ISO 4589:2017.

Other features and aspects of the present invention are set forth in greater detail below.

BRIEF DESCRIPTION OF THE FIGURES

A full and enabling disclosure of the present invention, including the best mode thereof to one skilled in the art, is set forth more particularly in the remainder of the specification, including reference to the accompanying figures, in which.

DETAILED DESCRIPTION

It is to be understood by one of ordinary skill in the art that the present discussion is a description of exemplary embodiments only, and is not intended as limiting the broader aspects of the present invention.

Generally speaking, the present invention is directed to a fiber-reinforced propylene polymer composition for use in a variety of electronic devices and systems. The composition comprises a polymer matrix that contains a propylene polymer and a plurality of long reinforcing fibers that are distributed within the polymer matrix. Through careful selection of the particular nature and concentration of the components of the polymer composition, the present inventors have discovered that the resulting composition can exhibit a synergistic combination of good electrical properties (i.e., low dielectric constant and dissipation factor) in combination with good mechanical properties and flame resistance. That is, the polymer composition may exhibit a low dielectric constant of about 4 or less, in some embodiments about 3.5 or less, in some embodiments from about 0.1 to about 3.4 and in some embodiments, from about 1 to about 3.3, in some embodiments, from about 1.5 to about 3.2, in some embodiments from about 2 to about 3.1, and in some embodiments, from about 2.5 to about 3.1 at high frequencies (e.g., 2 or 10 GHz). The dissipation factor of the polymer composition, which is a measure of the loss rate of energy, may likewise be about 0.01 or less, in some embodiments about 0.009 or less, in some embodiments about 0.008 or less, in some embodiments, about 0.007 or less, in some embodiments about 0.006 or less, and in some embodiments, from about 0.001 to about 0.005 at high frequencies (e.g., 2 or 10 GHz).

The polymer composition is also generally flame retardant. For example, the degree to which the composition can extinguish a fire ("char formation") may be represented by its Limiting Oxygen Index ("LOI"), which is the volume percentage of oxygen needed to support combustion. More particularly, the LOI of the polymer composition may be about 25 or more, in some embodiments about 27 or more, in some embodiments about 28 or more, and in some embodiments, from about 30 to 100, as determined in accordance with ISO 4589:2017 (technically equivalent to ASTM D2863-19). The flame retardancy may also be characterized in accordance the procedure of Underwriter's Laboratory Bulletin 94 entitled "Tests for Flammability of Plastic Materials, UL94." Several ratings can be applied based on the time to extinguish (total flame time of a set of 5 specimens) and ability to resist dripping as described in more detail below. According to this procedure, for example, the polymer composition may exhibit at least a V1 rating, and preferably a V0 rating at a part thickness as discussed in more detail below (e.g., 3 millimeters). For example, the composition may exhibit a total flame time of about 250 seconds or less (V1 rating), in some embodiments about 100 seconds or less, and in some embodiments, about 50 seconds or less (V0 rating).

Conventionally, it was believed that flame retardant polymer compositions exhibiting a low dissipation factor and dielectric constant would not also possess sufficiently mechanical properties. The present inventors have discovered, however, that the polymer composition is able to maintain excellent mechanical properties. For example, the polymer composition may exhibit a Charpy unnotched impact strength of about 20 kJ/m$^2$ or more, in some embodiments from about 30 to about 80 kJ/m$^2$, and in some embodiments, from about 40 to about 60 kJ/m$^2$, measured at according to ISO Test No. 179-1:2010) (technically equivalent to ASTM D256-10e1) at various temperatures, such as within a temperature range of from about −50° C. to about 85° C. (e.g., −40° C. or 23° C.). The tensile and flexural mechanical properties may also be good. For example, the polymer composition may exhibit a tensile strength of about 50 MPa or more 300 MPa, in some embodiments from about 80 to about 500 MPa, and in some embodiments, from about 85 to about 250 MPa; a tensile break strain of about 0.5% or more, in some embodiments from about 0.6% to about 5%, and in some embodiments, from about 0.7% to about 2.5%; and/or a tensile modulus of from about 3,500 MPa to about 20,000 MPa, in some embodiments from about 6,000 MPa to about 15,000 MPa, and in some embodiments, from about 8,000 MPa to about 15,000 MPa. The tensile properties may be determined in accordance with ISO Test No. 527-1:2019 (technically equivalent to ASTM D638-14) at various temperatures, such as within a temperature range of from about −50° C. to about 85° C. (e.g., −40° C. or 23° C.). The polymer composition may also exhibit a flexural strength of from about 100 to about 500 MPa, in some embodiments from about 130 to about 400 MPa, and in some embodiments, from about 140 to about 250 MPa; a flexural break strain of about 0.5% or more, in some embodiments from about 0.6% to about 5%, and in some embodiments, from about 0.7% to about 2.5%; and/or a flexural modulus of from about 4,500 MPa to about 20,000 MPa, in some embodiments from about 5,000 MPa to about 15,000 MPa, and in some embodiments, from about 5,500 MPa to about 12,000 MPa. The flexural properties may be determined in accordance with ISO Test No. 178:2019 (technically equivalent to ASTM D790-17) at various temperatures, such as within a temperature range of from about −50° C. to about 85° C. (e.g., −40° C. or 23° C.).

The polymer composition may also not be highly sensitive to aging at low or high temperatures. For example, the composition may be aged in an atmosphere having a temperature of from about −50° C. to about 85° C. (e.g., −40° C. or 85° C.) for a time period of about 100 hours or more, in some embodiments from about 300 hours to about 3000 hours, and in some embodiments, from about 400 hours to about 2500 hours (e.g., 500 or 1,000 hours). Even after aging, the mechanical properties (e.g., impact strength, tensile properties, and/or flexural properties) may remain within the ranges noted above. For example, the ratio of a particular mechanical property (e.g., Charpy unnotched impact strength, tensile strength, flexural strength, etc.) after "aging" at 150° C. for 1,000 hours to the initial mechanical property prior to such aging may be about 0.6 or more, in some embodiments about 0.7 or more, and in some embodiments, from about 0.8 to 1.0. Similarly, the polymer composition is not highly sensitive to ultraviolet light. For example, the polymer composition may be exposed to one or more cycles of ultraviolet light as noted above. Even after such exposure (e.g., total exposure level of 2,500 kJ/m$^2$ according to SAE J2527_2017092), the mechanical properties (e.g., impact strength, tensile strength, flexural strength, etc.) and the ratio of such properties may remain within the ranges noted above.

In certain embodiments, the composition can also provide a high degree of shielding effectiveness to electromagnetic interference ("EMI"). More particularly, the EMI shielding effectiveness may be about 20 decibels (dB) or more, in some embodiments about 25 dB or more, and in some embodiments, from about 30 dB to about 100 dB, as determined in accordance with ASTM D4935-18 at a frequency of 2 GHz. In addition to exhibiting good EMI shielding effectiveness, the composition may also exhibit a relatively low volume resistivity as determined in accordance with ASTM D257-14, such as about 5,000 ohm-cm or less, in some embodiments about 1,000 ohm-cm or less, and in some embodiments, from about 50 to about 800 ohm-cm.

Various embodiments of the present invention will now be described in more detail.

I. Polymer Matrix

A. Propylene Polymer

The polymer matrix functions as a continuous phase of the composition and contains one or more propylene polymers. For instance, propylene polymers typically constitute from about 30 wt. % to about 80 wt. %, in some embodiments from about 45 wt. % to about 75 wt. %, and in some embodiments, from about 50 wt. % to about 70 wt. % of the polymer matrix, as well as from about 30 wt. % to about 65 wt. %, in some embodiments from about 35 wt. % to about 60 wt. %, and in some embodiments, from about 40 wt. % to about 55 wt. % of the entire polymer composition.

Any of a variety of propylene polymers or combinations of propylene polymers may generally be employed in the polymer matrix, such as propylene homopolymers (e.g., syndiotactic, atactic, isotactic, etc.), propylene copolymers, and so forth. In one embodiment, for instance, a propylene polymer may be employed that is an isotactic or syndiotactic homopolymer. The term "syndiotactic" generally refers to a tacticity in which a substantial portion, if not all, of the methyl groups alternate on opposite sides along the polymer chain. On the other hand, the term "isotactic" generally refers to a tacticity in which a substantial portion, if not all, of the methyl groups are on the same side along the polymer chain. Such homopolymers may have a melting point of from about 160° C. to about 170° C. In yet other embodiments, a copolymer of propylene with an α-olefin monomer may be employed. Specific examples of suitable α-olefin monomers may include ethylene, 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. The propylene content of such copolymers may be from about 60 mole % to about 99 mole %, in some embodiments from about 80 mole % to about 98.5 mole %, and in some embodiments, from about 87 mole % to about 97.5 mole %. The α-olefin content may likewise range from about 1 mole % to about 40 mole %, in some embodiments from about 1.5 mole % to about 15 mole %, and in some embodiments, from about 2.5 mole % to about 13 mole %. The propylene polymers typically have a high degree of flow to help facilitate molding of the composition into small parts. High flow propylene polymers may, for example, have a relatively high melt flow index, such as about 150 grams per 10 minutes or more, in some embodiments about 180 grams per 10 minutes or more, and in some embodiments, from about 200 to about 500 grams per 10 minutes, as determined in accordance with ISO 1133-1:2011 (technically equivalent to ASTM D1238-13) at a load of 2.16 kg and temperature of 230° C.

Any of a variety of known techniques may generally be employed to form the propylene copolymers. For instance, such polymers may be formed using a free radical or a coordination catalyst (e.g., Ziegler-Natta). In some embodiments, for example, the polymer may be formed from a single-site coordination catalyst, such as a metallocene catalyst. Such a catalyst system produces copolymers in which the comonomer is randomly distributed within a molecular chain and uniformly distributed across the different molecular weight fractions. Examples of metallocene catalysts include bis(n-butylcyclopentadienyl)titanium dichloride, bis(n-butylcyclopentadienyl)zirconium dichloride, bis(cyclopentadienyl)scandium chloride, bis(indenyl)zirconium dichloride, bis(methylcyclopentadienyl)titanium dichloride, bis(methylcyclopentadienyl)zirconium dichloride, cobaltocene, cyclopentadienyltitanium trichloride, ferrocene, hafnocene dichloride, isopropyl(cyclopentadienyl, -1-flourenyl)zirconium dichloride, molybdocene dichloride, nickelocene, niobocene dichloride, ruthenocene, titanocene dichloride, zirconocene chloride hydride, zirconocene dichloride, and so forth. Polymers made using metallocene catalysts typically have a narrow molecular weight range. For instance, metallocene-catalyzed polymers may have polydispersity numbers (Mw/Mn) of below 4, controlled short chain branching distribution, and controlled isotacticity.

B. Flame Retardant System

In addition to the components above, the polymer matrix may also contain a flame retardant system to help achieve the desired flammability performance. The flame retardant system typically constitutes from about 5 wt. % to about 60 wt. %, in some embodiments from about 6 wt. % to about 50 wt. %, in some embodiments from about 8 wt. % to about 35 wt. %, and in some embodiments, from about 10 wt. % to about 30 wt. % of the polymer matrix, as well as from about 1 wt. % to about 50 wt. %, in some embodiments from about 5 wt. % to about 30 wt. %, and in some embodiments, from about 10 wt. % to about 25 wt. % of the entire polymer composition. The flame retardant system generally includes at least one low halogen flame retardant. The halogen (e.g., bromine, chlorine, and/or fluorine) content of such an agent is about 1,500 parts per million by weight ("ppm") or less, in some embodiments about 900 ppm or less, and in some embodiments, about 50 ppm or less. In certain embodiments, the flame retardants are complete free of halogens (i.e., 0 ppm). The specific nature of the halogen-free flame retardants may be selected to help achieve the desired flammability properties without adversely impacting the dielectric performance (e.g., dielectric constant, dissipation factor, etc.) and mechanical properties of the polymer composition.

For instance, the system may contain one or more organophosphorous flame retardants, such as phosphate salts, phosphoric acid esters, phosphonic acid esters, phosphonate amines, phosphazenes, phosphinic salts, etc., as well mixtures thereof. In one embodiment, the organophosphorous flame retardant may be a nitrogen-containing phosphate salt formed from the reaction of a nitrogen-containing base and phosphoric acid. Suitable nitrogen-containing bases may include those having a substituted or unsubstituted ring structure, along with at least one nitrogen heteroatom in the ring structure (e.g., heterocyclic or heteroaryl group) and/or at least one nitrogen-containing functional group (e.g., amino, acylamino, etc.) substituted at a carbon atom and/or a heteroatom of the ring structure. Examples of such heterocyclic groups may include, for instance, pyrrolidine, imidazoline, pyrazolidine, oxazolidine, isoxazolidine, thiazolidine, isothiazolidine, piperidine, piperazine, thiomorpholine, etc. Likewise, examples of heteroaryl groups may include, for instance, pyrrole, imidazole, pyrazole, oxazole, isoxazole, thiazole, isothiazole, triazole, furazan, oxadiazole, tetrazole, pyridine, diazine, oxazine, triazine, tetrazine, and so forth. If desired, the ring structure of the base may also be substituted with one or more functional groups, such as acyl, acyloxy, acylamino, alkoxy, alkenyl, alkyl, amino, aryl, aryloxy, carboxyl, carboxyl ester, cycloalkyl, hydroxyl, halo, haloalkyl, heteroaryl, heterocyclyl, etc. Substitution may occur at a heteroatom and/or a carbon atom of the ring structure.

One suitable nitrogen-containing base is melamine, which contains a 1,3,5 triazine ring structure substituted with an amino functional groups at each of the three carbon atoms. Examples of suitable melamine phosphate salts may include, for instance, melamine orthophosphate, melamine pyrophosphate, melamine polyphosphate, etc. Melamine pyrophosphate may, for example, contain a molar ratio of pyrophosphoric acid to melamine of about 1:2. Another suitable nitrogen-containing base is piperazine, which is a six-membered ring structure containing two nitrogen atoms at opposite positions in the ring. Examples of suitable piperazine phosphate salts may include, for instance, piperazine orthophosphate, piperazine pyrophosphate, piperazine polyphosphate, etc. Piperazine pyrophosphate may, for example, contain a molar ratio of pyrophosphoric acid to melamine of about 1:1. In certain embodiments, a blend of melamine and piperazine phosphate salts may be employed in the flame retardant system. The flame retardant system may, for example, contain one or more piperazine phosphate salts (e.g., piperazine pyrophosphate) in an amount of from about 40 wt. % to about 90 wt. %, in some embodiments from about 50 wt. % to about 80 wt. %, and one or more melamine phosphate salts (e.g., melamine pyrophosphate) in an amount of from about 10 wt. % to about 60 wt. %, in some embodiments from about 20 wt. % to about 50 wt. %, and in some embodiments, from about 25 wt. % to about 45 wt. %.

Of course, other organophosphorous flame retardants may also be employed. For example, in one embodiment, mono- and oligomeric phosphoric and phosphonic esters may be employed, such as tributyl phosphate, triphenyl phosphate, tricresyl phosphate, diphenyl cresyl phosphate, diphenyl octyl phosphate, diphenyl 2-ethylcresyl phosphate, tri(isopropylphenyl) phosphate, resorcinol-bridged oligophosphate, bisphenol A phosphates (e.g., bisphenol A-bridged oligophosphate or bisphenol A bis(diphenyl phosphate)), etc., as well as mixtures thereof. A phosphinic salt may be employed, such as a salt of a phosphinic acid and/or diphosphinic acid. Particularly suitable phosphinic salts include, for example, salts of dimethylphosphinic acid, ethylmethylphosphinic acid, diethylphosphinic acid, methyl-n-propylphosphinic acid, methane-di(methylphosphinic acid), ethane-1,2-di(methylphosphinic acid), hexane-1,6-di(methylphosphinic acid), benzene-1,4-di(methylphosphinic acid), methylphenylphosphinic acid, diphenylphosphinic acid, hypophosphoric acid, etc. The resulting salts are typically monomeric compounds; however, polymeric phosphinates may also be formed. Particularly suitable phosphinic salts are zinc or aluminum diethylphosphinate.

In certain embodiments, the flame retardant system may be formed entirely from organophosphorous flame retardants, such as those described above. In other cases, however, the organophosphorous flame retardant(s) may be employed in combination with one or more additional additives. In such embodiments, organophosphorous compounds may constitute from about 50 wt. % to about 99.5 wt. %, in some embodiments from about 70 wt. % to about 99 wt. %, and in some embodiments, from about 80 wt. % to about 95 wt. % of the flame retardant system, as well as from about 1 wt. % to about 30 wt. %, in some embodiments from about 2 wt. % to about 25 wt. %, and in some embodiments, from about 5 wt. % to about 20 wt. % of the polymer matrix.

One suitable type of additive that may be employed is an inorganic compound, which may be employed as a low halogen char-forming agent and/or smoke suppressant. Suitable inorganic compounds (anhydrous or hydrates) may include, for instance, inorganic molybdates, such as zinc molybdate (e.g., commercially available under the designation Kemgard® from Huber Engineered Materials), calcium molybdate, ammonium octamolybdate, zinc molybdate-magnesium silicate, etc. Other suitable inorganic compounds may include inorganic borates, such as zinc borate (commercially available under the designation Firebrake® from Rio Tento Minerals), etc.); zinc phosphate, zinc hydrogen phosphate, zinc pyrophosphate, basic zinc chromate (VI) (zinc yellow), zinc chromite, zinc permanganate, silica, magnesium silicate, calcium silicate, calcium carbonate, zinc oxide, titanium dioxide, magnesium dihydroxide, and so forth. In particular embodiments, it may be desired to use an inorganic zinc compound, such as zinc molybdate, zinc borate, zinc oxide, etc., to enhance the overall performance of the composition. When employed, such inorganic compounds (e.g., zinc oxide) may, for example, constitute from about 1 wt. % to about 20 wt. %, in some embodiments from about 2 wt. % to about 15 wt. %, and in some embodiments, from about 3 wt. % to about 10 wt. % of the flame retardant system.

Another suitable additive is a nitrogen-containing synergist that can act in conjunction with the organophosphorous flame retardant(s) and/or other components to result in a more effective flame retardant system. Such nitrogen-containing synergists may include those of the formulae (III) to (VIII), or a mixture of thereof:

(III)

(IV)

(V)

(VI)

(VII)

(VIII)

wherein,
$R_5$, $R_6$, $R_7$, $R_9$, $R_{10}$, $R_{11}$, $R_{12}$, and $R_{13}$ are, independently, hydrogen; $C_1$-$C_8$ alkyl; $C_5$-$C_{16}$-cycloalkyl or alkylcycloalkyl, optionally substituted with a hydroxy or a $C_1$-$C_4$ hydroxyalkyl; $C_2$-$C_8$ alkenyl; $C_1$-$C_8$ alkoxy, acyl, or acyloxy; $C_6$-$C_{12}$-aryl or arylalkyl; $OR^8$ or $N(R^8)R^9$, wherein $R^8$ is hydrogen, $C_1$-$C_8$ alkyl, $C_5$-$C_{16}$ cycloalkyl or alkylcycloalkyl, optionally substituted with a hydroxy or a $C_1$-$C_4$ hydroxyalkyl, $C_2$-$C_8$ alkenyl, $C_1$-$C_8$ alkoxy, acyl, or acyloxy, or $C_6$-$C_{12}$ aryl or arylalkyl;
m is from 1 to 4;
n is from 1 to 4;
X is an acid that can form adducts with triazine compounds of the formula III. For example, the nitrogen-containing synergist may include benzoguanamine, tris(hydroxyethyl) isocyanurate, allantoin, glycoluril, melamine, melamine cyanurate, dicyandiamide, guanidine, etc. Examples of such synergists are described in U.S. Pat. No. 6,365,071 to Jenewein, et al.; U.S. Pat. No. 7,255,814 to Hoerold, et al.; and U.S. Pat. No. 7,259,200 to Bauer, et al. One particularly suitable synergist is melamine cyanurate, such as commercially available from BASF under the name MELAPUR® MC (e.g., MELAPUR® MC 15, MC25, MC50).

As noted above, the flame retardant system and/or the polymer composition itself generally have a relatively low content of halogens (i.e., bromine, fluorine, and/or chlorine), such as about 15,000 parts per million ("ppm") or less, in some embodiments about 5,000 ppm or less, in some embodiments about 1,000 ppm or less, in some embodiments about 800 ppm or less, and in some embodiments, from about 1 ppm to about 600 ppm. Nevertheless, in certain embodiments of the present invention, halogen-based flame retardants may still be employed as an optional component. Particularly suitable halogen-based flame retardants are fluoropolymers, such as polytetrafluoroethylene (PTFE), fluorinated ethylene polypropylene (FEP) copolymers, perfluoroalkoxy (PFA) resins, polychlorotrifluoroethylene (PCTFE) copolymers, ethylene-chlorotrifluoroethylene (ECTFE) copolymers, ethylene-tetrafluoroethylene (ETFE) copolymers, polyvinylidene fluoride (PVDF), polyvinylfluoride (PVF), and copolymers and blends and other combination thereof. When employed, such halogen-based flame retardants typically constitute only about 10 wt. % or less, in some embodiments about 5 wt. % or less, and in some embodiments, about 1 wt. % or less of the flame retardant system. Likewise, the halogen-based flame retardants typically constitute about 5 wt. % or less, in some embodiments about 1 wt. % or less, and in some embodiments, about 0.5 wt. % or less of the entire polymer composition.

C. Stabilizer System

Although by no means required, the polymer matrix may also contain a stabilizer system to help maintain the desired surface appearance and/or mechanical properties even after being exposed to ultraviolet light and high temperatures. More particularly, the stabilizer system may include one or more at antioxidants (e.g., sterically hindered phenol antioxidant, phosphite antioxidant, thioester antioxidant, etc.) and/or ultraviolet light stabilizers, as well as various other optional light stabilizers, optional heat stabilizers, and so forth.

i. Antioxidants

One type of antioxidant that may be employed in the polymer composition is a sterically hindered phenol. When employed, sterically hindered phenols are typically present in an amount of from about 0.01 to about 1 wt. %, in some embodiments from about 0.02 wt. % to about 0.5 wt. %, and in some embodiments, from about 0.05 wt. % to about 0.3 wt. % of the polymer composition. While a variety of different compounds may be employed, particularly suitable hindered phenol compounds are those having one of the following general structures (IV), (V) and (VI):

wherein, a, b and c independently range from 1 to 10, and in some embodiments, from 2 to 6;

$R^8$, $R^9$, $R^{10}$, $R^{11}$, and $R^{12}$ are independently selected from hydrogen, $C_1$ to $C_{10}$ alkyl, and $C_3$ to $C_{30}$ branched alkyl, such as methyl, ethyl, propyl, isopropyl, butyl, or tertiary butyl moieties; and $R^{13}$, $R^{14}$ and $R^{15}$ are independently selected from moieties represented by one of the following general structures (VII) and (VIII):

wherein, d ranges from 1 to 10, and in some embodiments, from 2 to 6;

$R^{16}$, $R^{17}$, $R^{18}$, and $R^{19}$ are independently selected from hydrogen, $C_1$ to $C_{10}$ alkyl, and $C_3$ to $C_{30}$ branched alkyl, such as methyl, ethyl, propyl, isopropyl, butyl, or tertiary butyl moieties.

Specific examples of suitable hindered phenols having a general structure as set forth above may include, for instance, 2,6-di-tert-butyl-4-methylphenol; 2,4-di-tert-butyl-phenol; pentaerythrityl tetrakis(3,5-di-tert-butyl-4-hydroxyphenyl)propionate; octadecyl-3-(3',5'-di-tert-butyl-4'-hydroxyphenyl)propionate; tetrakis[methylene(3,5-di-tert-butyl-4-hydroxycinnamate)]methane, bis-2,2'-methylene-bis(6-tert-butyl-4-methylphenol)terephthalate, 1,3,5-trimethyl-2,4,6-tris(3,5-di-tert-butyl-4-hydroxybenzyl) benzene, tris(3,5-di-tert-butyl-4-hydroxybenzyl) isocyanurate; 1,3,5-tris(4-tert-butyl-3-hydroxy-2,6-dimethylbenzyl)1,3,5-triazine-2,4,6-(1H,3H,5H)-trione, 1,1,3-tris(2-methyl-4-hydroxy-5-tert-butylphenyl)butane, 1,3,5-triazine-2,4,6(1H,3H,5H)-trione, 1,3,5-tris[[3,5-bis-(1,1-dimethylethyl)-4-hydroxyphenyl]methyl]4,4',4"-[(2,4,6-trimethyl-1,3,5-benzenetriyl)tris-(methylene)]tris[2,6-bis(1,1-dimethylethyl)]; 6-tert-butyl-3-methylphenyl; 2,6-di-tert-butyl-p-cresol; 2,2'-methylenebis(4-ethyl-6-tert-butylphenol); 4,4'-butylidenebis(6-tert-butyl-m-cresol); 4,4'-thiobis(6-tert-butyl-m-cresol); 4,4'-dihydroxydiphenyl-cyclohexane; alkylated bisphenol; styrenated phenol; 2,6-di-tert-butyl-4-methylphenol; n-octadecyl-3-(3',5'-di-tert-butyl-4'-hydroxyphenyl)propionate; 2,2'-methylenebis(4-methyl-6-tert-butylphenol); 4,4'-thiobis(3-methyl-6-tert-butylphenyl); 4,4'-butylidenebis(3-methyl-6-tert-butylphenol); stearyl-8-(3,5-di-tert-butyl-4-hydroxyphenyl) propionate; 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, tetrakis[methylene-3-(3',5'-di-tert-butyl-4'-hydroxyphenyl)propionate]methane, stearyl 3,5-di-tert-butyl-4-hydroxyhydocinnamate; and so forth, as well as mixtures thereof.

Particularly suitable compounds are those having the general structure (VI), such as tris(3,5-di-tert-butyl-4-hydroxybenzyl)isocyanurate, which is commercially available under the designation Irganox® 3114.

Another suitable antioxidant is a phosphite antioxidant. When employed, phosphite antioxidants are typically present in an amount of from about 0.02 to about 2 wt. %, in some embodiments from about 0.04 wt. % to about 1 wt. %, and in some embodiments, from about 0.1 wt. % to about 0.6 wt. % of the polymer composition. The phosphite antioxidant may include a variety of different compounds, such as aryl monophosphites, aryl disphosphites, etc., as well as mixtures thereof. For example, an aryl diphosphite may be employed that has the following general structure (IX):

wherein, $R_1$, $R_2$, $R_3$, $R_4$, $R_5$, $R_6$, $R_7$, $R_8$, $R_9$, and $R_{10}$ are independently selected from hydrogen, $C_1$ to $C_{10}$ alkyl, and $C_3$ to $C_{30}$ branched alkyl, such as methyl, ethyl, propyl, isopropyl, butyl, or tertiary butyl moieties.

Examples of such aryl diphosphite compounds include, for instance, bis(2,4-dicumylphenyl)pentaerythritol diphosphite (commercially available as Doverphos® S-9228) and bis(2,4-di-t-butylphenyl)pentaerythritol diphosphite (commercially available as Ultranox® 626). Likewise, suitable aryl monophosphites may include tris(2,4-di-tert-butylphenyl)phosphite (commercially available as Irgafos® 168); bis(2,4-di-tert-butyl-6-methylphenyl) ethyl phosphite (commercially available as Irgafos® 38); and so forth.

Yet another suitable antioxidant is a thioester antioxidant. When employed, thioester antioxidants are also typically present in an amount of from about 0.04 to about 4 wt. %, in some embodiments from about 0.08 wt. % to about 2 wt. %, and in some embodiments, from about 0.2 wt. % to about 1.2 wt. % of the polymer composition. Particularly suitable thioester antioxidants for use in the present invention are thiocarboxylic acid esters, such as those having the following general structure:

$$R_{11}—O(O)(CH_2)_x—S—(CH_2)_y(O)O—R_{12}$$

wherein, x and y are independently from 1 to 10, in some embodiments 1 to 6, and in some embodiments, 2 to 4 (e.g., 2);

$R_{11}$ and $R_{12}$ are independently selected from linear or branched, $C_6$ to $C_{30}$ alkyl, in some embodiments $C_{10}$ to $C_{24}$ alkyl, and in some embodiments, $C_{12}$ to $C_{20}$ alkyl, such as lauryl, stearyl, octyl, hexyl, decyl, dodecyl, oleyl, etc.

Specific examples of suitable thiocarboxylic acid esters may include for instance, distearyl thiodipropionate (commercially available as Irganox® PS 800), dilauryl thiodipropionate (commercially available as Irganox® PS 802), di-2-ethylhexyl-thiodipropionate, diisodecyl thiodipropionate, etc.

In particularly suitable embodiments of the present invention, a combination of antioxidants may be employed to help provide a synergistic effect on the properties of the composition. In one embodiment, for instance, the stabilizer system may employ a combination of at least one sterically hindered antioxidant, phosphite antioxidant, and thioester antioxidant. When employed, the weight ratio of the phosphite antioxidant to the hindered phenol antioxidant may range from about 1:1 to about 5:1, in some embodiments from about 1:1 to about 4:1, and in some embodiments, from about 1.5:1 to about 3:1 (e.g., about 2:1). The weight ratio of the thioester stabilizer to the phosphite antioxidant is also generally from about 1:1 to about 5:1, in some embodiments from about 1:1 to about 4:1, and in some embodiments, from about 1.5:1 to about 3:1 (e.g., about 2:1). Likewise, the weight ratio of the thioester antioxidant to the hindered phenol antioxidant is also generally from about 2:1 to about 10:1, in some embodiments from about 2:1 to about 8:1, and in some embodiments, from about 3:1 to about 6:1 (e.g., about 4:1). Within these selected ratios, it is believed that the composition is capable of achieving a unique ability to remain stable even after exposure to high temperatures and/or ultraviolet light.

The polymer composition may also contain one or more UV stabilizers. Suitable UV stabilizers may include, for instance, benzophenones (e.g., (2-hydroxy-4-(octyloxy)phenyl)phenyl, methanone (Chimassorb® 81), benzotriazoles (e.g., 2-(2-hydroxy-3,5-di-α-cumylphenyl)-2H-benzotriazole (Tinuvin® 234), 2-(2-hydroxy-5-tert-octylphenyl)-2H-benzotriazole (Tinuvin® 329), 2-(2-hydroxy-3-α-cumyl-5-tert-octylphenyl)-2H-benzotriazole (Tinuvin® 928), etc.), triazines (e.g., 2,4-diphenyl-6-(2-hydroxy-4-hexyloxyphenyl)-s-triazine (Tinuvin® 1577)), sterically hindered amines (e.g., bis(2,2,6,6-tetramethyl-4-piperidyl)sebacate (Tinuvin® 770) or a polymer of dimethyl succinate and 1-(2-hydroxyethyl)-4-hydroxy-2,2,6,6-tetramethyl-4-piperidine (Tinuvin®622)), and so forth, as well as mixtures thereof. Benzophenones are particularly suitable for use in the polymer composition. When employed, such UV stabilizers typically constitute from about 0.05 wt. % to about 2 wt. % in some embodiments from about 0.1 wt. % to about 1.5 wt. %, and in some embodiments, from about 0.2 wt. % to about 1.0 wt. % of the composition.

D. Other Components

In addition to the components noted above, the polymer matrix may also contain a variety of other components. Examples of such optional components may include, for instance, EMI fillers, compatibilizers, particulate fillers, lubricants, colorants, flow modifiers, pigments, and other materials added to enhance properties and processability. When EMI shielding properties are desired, for instance, an EMI filler may be employed. The EMI filler is generally formed from an electrically conductive material that can provide the desired degree of electromagnetic interference shielding. In certain embodiments, for instance, the material contains a metal, such as stainless steel, aluminum, zinc, iron, copper, silver, nickel, gold, chrome, etc., as well alloys or mixtures thereof. The EMI filler may also possess a variety of different forms, such as particles (e.g., iron powder), flakes (e.g., aluminum flakes, stainless steel flakes, etc.), or fibers. Particularly suitable EMI fillers are fibers that contain a metal. In such embodiments, the fibers may be formed from primarily from the metal (e.g., stainless steel fibers) or the fibers may be formed from a core material that is coated with the metal. When employing a metal coating, the core material may be formed from a material that is either conductive or insulative in nature. For example, the core material may be formed from carbon, glass, or a polymer. One example of such a fiber is nickel-coated carbon fibers.

A compatibilizer may also be employed to enhance the degree of adhesion between the long fibers with the polymer matrix. When employed, such compatibilizers typically constitute from about 0.1 wt. % to about 15 wt. %, in some embodiments from about 0.5 wt. % to about 10 wt. %, and in some embodiments, from about 1 wt. % to about 5 wt. % of the polymer composition. In certain embodiments, the compatibilizer may be a polyolefin compatibilizer that contains a polyolefin that is modified with a polar functional group. The polyolefin may be an olefin homopolymer (e.g., polypropylene) or copolymer (e.g., ethylene copolymer, propylene copolymer, etc.). The functional group may be grafted onto the polyolefin backbone or incorporated as a monomeric constituent of the polymer (e.g., block or random copolymers), etc. Particularly suitable functional groups include maleic anhydride, maleic acid, fumaric acid, maleimide, maleic acid hydrazide, a reaction product of maleic anhydride and diamine, dichloromaleic anhydride, maleic acid amide, etc.

Regardless of the particular components employed, the raw materials (e.g., thermoplastic polymers, flame retardants, stabilizers, compatibilizers, etc.) are typically melt blended together to form the polymer matrix prior to being reinforced with the long fibers. The raw materials may be supplied either simultaneously or in sequence to a melt-blending device that dispersively blends the materials. Batch and/or continuous melt blending techniques may be employed. For example, a mixer/kneader, Banbury mixer, Farrel continuous mixer, single-screw extruder, twin-screw extruder, roll mill, etc., may be utilized to blend the materials. One particularly suitable melt-blending device is a co-rotating, twin-screw extruder (e.g., ZSK-30 twin-screw extruder available from Werner & Pfleiderer Corporation of Ramsey, N.J.). Such extruders may include feeding and venting ports and provide high intensity distributive and dispersive mixing. For example, the propylene polymer may be fed to a feeding port of the twin-screw extruder and melted. Thereafter, the stabilizers may be injected into the polymer melt. Alternatively, the stabilizers may be separately fed into the extruder at a different point along its length. Regardless of the particular melt blending technique chosen, the raw materials are blended under high shear/pressure and heat to ensure sufficient mixing. For example, melt blending may occur at a temperature of from about 150° C. to about 300° C., in some embodiments, from about 155° C. to about 250° C., and in some embodiments, from about 160° C. to about 220° C.

As noted above, certain embodiments of the present invention contemplate the use of a blend of polymers within the polymer matrix (e.g., propylene homopolymers and/or propylene/α-olefin copolymers). In such embodiments, each of the polymers employed in the blend may be melt blended in the manner described above. In yet other embodiments, however, it may be desired to melt blend a first polymer (e.g., propylene polymer) to form a concentrate, which is then reinforced with long fibers in the manner described below to form a precursor composition. The precursor composition may thereafter be blended (e.g., dry blended) with a second polymer (e.g., propylene polymer) to form a polymer composition with the desired properties. It should also be understood that additional polymers can also be added during prior to and/or during reinforcement of the polymer matrix with the long fibers.

II. Long Fibers

To form the fiber-reinforced composition of the present invention, long fibers are generally embedded within the polymer matrix. Long fibers may, for example, constitute from about 10 wt. % to about 40 wt. %, in some embodiments from about 12 wt. % to about 38 wt. %, and in some embodiments, from about 15 wt. % to about 35 wt. % of the composition. Likewise, the polymer matrix typically constitutes from about 60 wt. % to about 90 wt. %, in some embodiments from about 62 wt. % to about 88 wt. %, and in some embodiments, from about 65 wt. % to about 85 wt. % of the composition.

The term "long fibers" generally refers to fibers, filaments, yarns, or rovings (e.g., bundles of fibers) that are not continuous and have a length of from about 1 to about 25 millimeters, in some embodiments, from about 1.5 to about 20 millimeters, in some embodiments from about 2 to about 15 millimeters, and in some embodiments, from about 3 to about 12 millimeters. A substantial portion of the fibers may maintain a relatively large length even after being formed into a shaped part (e.g., injection molding). That is, the median length (D50) of the fibers in the composition may be about 1 millimeter or more, in some embodiments about 1.5 millimeters or more, in some embodiments about 2.0 millimeters or more, and in some embodiments, from about 2.5 to about 8 millimeters. Regardless of their length, the nominal diameter of the fibers (e.g., diameter of fibers within a roving) may be selectively controlled to help improve the surface appearance of the resulting polymer composition. More particularly, the nominal diameter of the fibers may range from about 20 to about 40 micrometers, in some embodiments from about 20 to about 30 micrometers, and in some embodiments, from about 21 to about 26 micrometers. Within this range, the tendency of the fibers to become "clumped" on the surface of a shaped part is reduced, which allows the color and the surface appearance of the part to predominantly stem from the polymer matrix. In addition to providing improved aesthetic consistency, it also allows the color to be better maintained after exposure to ultraviolet light as a stabilizer system can be more readily employed within the polymer matrix. Of course, it should be understood that other nominal diameters may be employed, such as those from about 1 to about 20 micrometers, in some embodiments from about 8 to about 19 micrometers, and in some embodiments, from about 10 to about 18 micrometers.

The fibers may be formed from any conventional material known in the art, such as metal fibers; glass fibers (e.g., E-glass, A-glass, C-glass, D-glass, AR-glass, R-glass, S1-glass, S2-glass), carbon fibers (e.g., graphite), boron fibers, ceramic fibers (e.g., alumina or silica), aramid fibers (e.g., Kevlar®), synthetic organic fibers (e.g., polyamide, polyethylene, paraphenylene, terephthalamide, polyethylene terephthalate and polyphenylene sulfide), metal fibers as described above (e.g., stainless fibers), and various other natural or synthetic inorganic or organic fibrous materials known for reinforcing thermoplastic compositions. Glass fibers, and particularly S-glass fibers, are particularly desirable. The fibers may be twisted or straight. If desired, the fibers may be in the form of rovings (e.g., bundle of fibers) that contain a single fiber type or different types of fibers. Different fibers may be contained in individual rovings or, alternatively, each roving may contain a different fiber type. For example, in one embodiment, certain rovings may contain carbon fibers, while other rovings may contain glass fibers. The number of fibers contained in each roving can be constant or vary from roving to roving. Typically, a roving may contain from about 1,000 fibers to about 50,000 individual fibers, and in some embodiments, from about 2,000 to about 40,000 fibers.

Figure 1:
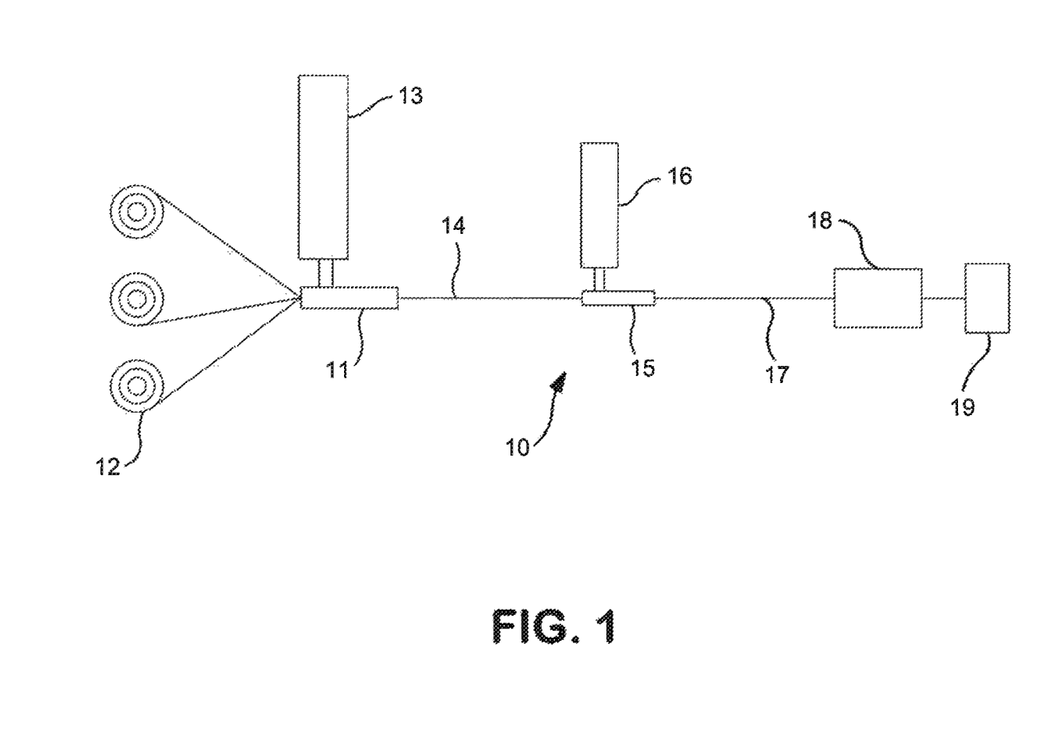
FIG. 1 is a schematic illustration of one embodiment of a system that may be used to form the polymer composition of the present invention.

Any of a variety of different techniques may generally be employed to incorporate the fibers into the polymer matrix. The long fibers may be randomly distributed within the polymer matrix, or alternatively distributed in an aligned fashion. In one embodiment, for instance, continuous fibers may initially be impregnated into the polymer matrix to form strands, which are thereafter cooled and then chopped into pellets to that the resulting fibers have the desired length for the long fibers. In such embodiments, the polymer matrix and continuous fibers (e.g., rovings) are typically pultruded through an impregnation die to achieve the desired contact between the fibers and the polymer. Pultrusion can also help ensure that the fibers are spaced apart and aligned in the same or a substantially similar direction, such as a longitudinal direction that is parallel to a major axis of the pellet (e.g., length), which further enhances the mechanical properties. Referring to FIG. 1, for instance, one embodiment of a pultrusion process 10 is shown in which a polymer matrix is supplied from an extruder 13 to an impregnation die 11 while continuous fibers 12 are a pulled through the die 11 via a puller device 18 to produce a composite structure 14. Typical puller devices may include, for example, caterpillar pullers and reciprocating pullers. While optional, the composite structure 14 may also be pulled through a coating die 15 that is attached to an extruder 16 through which a coating resin is applied to form a coated structure 17. As shown in FIG. 1, the coated structure 17 is then pulled through the puller assembly 18 and supplied to a pelletizer 19 that cuts the structure 17 into the desired size for forming the long fiber-reinforced composition.

Figure 2:
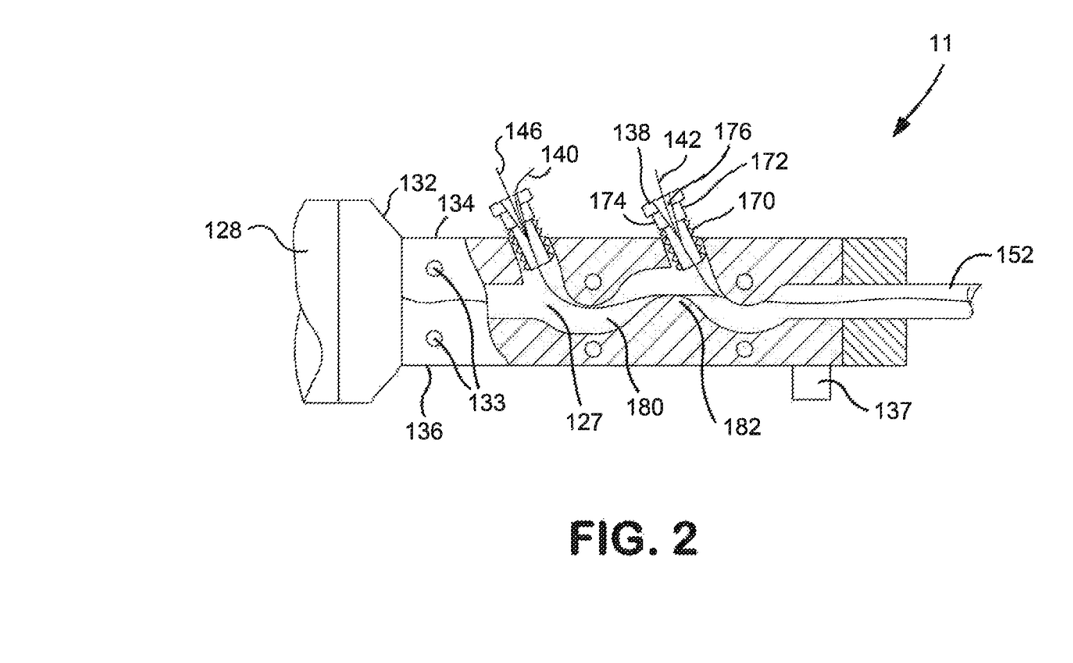
FIG. 2 is a cross-sectional view of an impregnation die that may be employed in the system shown in FIG. 1.

The nature of the impregnation die employed during the pultrusion process may be selectively varied to help achieved good contact between the polymer matrix and the long fibers. Examples of suitable impregnation die systems are described in detail in Reissue Pat. No. 32,772 to Hawley; U.S. Pat. No. 9,233,486 to Regan, et al.; and U.S. Pat. No. 9,278,472 to Easter), et al. Referring to FIG. 2, for instance, one embodiment of such a suitable impregnation die 11 is shown. As shown, a polymer matrix 127 may be supplied to the impregnation die 11 via an extruder (not shown). More particularly, the polymer matrix 127 may exit the extruder through a barrel flange 128 and enter a die flange 132 of the die 11. The die 11 contains an upper die half 134 that mates with a lower die half 136. Continuous fibers 142 (e.g., roving) are supplied from a reel 144 through feed port 138 to the upper die half 134 of the die 11. Similarly, continuous fibers 146 are also supplied from a reel 148 through a feed port 140. The matrix 127 is heated inside die halves 134 and 136 by heaters 133 mounted in the upper die half 134 and/or lower die half 136. The die is generally operated at temperatures that are sufficient to cause melting and impregnation of the thermoplastic polymer. Typically, the operation temperature of the die is higher than the melt temperature of the polymer matrix. When processed in this manner, the continuous fibers 142 and 146 become embedded in the matrix 127. The mixture is then pulled through the impregnation die 11 to create a fiber-reinforced composition 152. If desired, a pressure sensor 137 may also sense the pressure near the impregnation die 11 to allow control to be exerted over the rate of extrusion by controlling the rotational speed of the screw shaft, or the federate of the feeder.

Within the impregnation die, it is generally desired that the fibers contact a series of impingement zones. At these zones, the polymer melt may flow transversely through the fibers to create shear and pressure, which significantly enhances the degree of impregnation. This is particularly useful when forming a composite from ribbons of a high fiber content. Typically, the die will contain at least 2, in some embodiments at least 3, and in some embodiments, from 4 to 50 impingement zones per roving to create a sufficient degree of shear and pressure. Although their particular form may vary, the impingement zones typically possess a curved surface, such as a curved lobe, rod, etc. The impingement zones are also typically made of a metal material.

FIG. 2 shows an enlarged schematic view of a portion of the impregnation die 11 containing multiple impingement zones in the form of lobes 182. It should be understood that this invention can be practiced using a plurality of feed ports, which may optionally be coaxial with the machine direction. The number of feed ports used may vary with the number of fibers to be treated in the die at one time and the feed ports may be mounted in the upper die half 134 or the lower die half 136. The feed port 138 includes a sleeve 170 mounted in upper die half 134. The feed port 138 is slidably mounted in a sleeve 170. The feed port 138 is split into at least two pieces, shown as pieces 172 and 174. The feed port 138 has a bore 176 passing longitudinally therethrough. The bore 176 may be shaped as a right cylindrical cone opening away from the upper die half 134. The fibers 142 pass through the bore 176 and enter a passage 180 between the upper die half 134 and lower die half 136. A series of lobes 182 are also formed in the upper die half 134 and lower die half 136 such that the passage 210 takes a convoluted route. The lobes 182 cause the fibers 142 and 146 to pass over at least one lobe so that the polymer matrix inside the passage 180 thoroughly contacts each of the fibers. In this manner, thorough contact between the molten polymer and the fibers 142 and 146 is assured.

To further facilitate impregnation, the fibers may also be kept under tension while present within the impregnation die. The tension may, for example, range from about 5 to about 300 Newtons, in some embodiments from about 50 to about 250 Newtons, and in some embodiments, from about 100 to about 200 Newtons per tow of fibers. Furthermore, the fibers may also pass impingement zones in a tortuous path to enhance shear. For example, in the embodiment shown in FIG. 2, the fibers traverse over the impingement zones in a sinusoidal-type pathway. The angle at which the rovings traverse from one impingement zone to another is generally high enough to enhance shear, but not so high to cause excessive forces that will break the fibers. Thus, for example, the angle may range from about 1° to about 30°, and in some embodiments, from about 5° to about 25°.

The impregnation die shown and described above is but one of various possible configurations that may be employed in the present invention. In alternative embodiments, for example, the fibers may be introduced into a crosshead die that is positioned at an angle relative to the direction of flow of the polymer melt. As the fibers move through the crosshead die and reach the point where the polymer exits from an extruder barrel, the polymer is forced into contact with the fibers. It should also be understood that any other extruder design may also be employed, such as a twin screw extruder. Still further, other components may also be optionally employed to assist in the impregnation of the fibers. For example, a "gas jet" assembly may be employed in certain embodiments to help uniformly spread a bundle or tow of individual fibers, which may each contain up to as many as 24,000 fibers, across the entire width of the merged tow. This helps achieve uniform distribution of strength properties in the ribbon. Such an assembly may include a supply of compressed air or another gas that impinges in a generally perpendicular fashion on the moving fiber tows that pass across the exit ports. The spread fiber bundles may then be introduced into a die for impregnation, such as described above.

The fiber-reinforced polymer composition may generally be employed to form a shaped part using a variety of different techniques. Suitable techniques may include, for instance, injection molding, low-pressure injection molding, extrusion compression molding, gas injection molding, foam injection molding, low-pressure gas injection molding, low-pressure foam injection molding, gas extrusion compression molding, foam extrusion compression molding, extrusion molding, foam extrusion molding, compression molding, foam compression molding, gas compression molding, etc. For example, an injection molding system may be employed that includes a mold within which the fiber-reinforced composition may be injected. The time inside the injector may be controlled and optimized so that polymer matrix is not pre-solidified. When the cycle time is reached and the barrel is full for discharge, a piston may be used to inject the composition to the mold cavity. Compression molding systems may also be employed. As with injection molding, the shaping of the fiber-reinforced composition into the desired article also occurs within a mold. The composition may be placed into the compression mold using any known technique, such as by being picked up by an automated robot arm. The temperature of the mold may be maintained at or above the solidification temperature of the polymer matrix for a desired time period to allow for solidification. The molded product may then be solidified by bringing it to a temperature below that of the melting temperature. The resulting product may be de-molded. The cycle time for each molding process may be adjusted to suit the polymer matrix, to achieve sufficient bonding, and to enhance overall process productivity. Due to the unique properties of the fiber-reinforced composition, relatively thin shaped parts (e.g., injection molded parts) can be readily formed therefrom. For example, such parts may have a thickness of about 10 millimeters or less, in some embodiments about 8 millimeters or less, in some embodiments about 6 millimeters or less, in some embodiments from about 0.4 to about 5 millimeters, and in some embodiments, from about 0.8 to about 4 millimeters (e.g., 0.8, 1.2. or 3 millimeters).

II. Applications

Due to its unique properties, the polymer composition may be employed in a wide variety of electronic devices and systems. In certain embodiments, for instance, the device may be an electronic module that contains a housing that receives one or more electronic components (e.g., printed circuit board, antenna elements, radio frequency sensing elements, sensors, light sensing and/or transmitting elements (e.g., fibers optics), cameras, global positioning devices, etc.). The housing may, for instance, include a base that contains a sidewall extending therefrom. A cover may also be supported on the sidewall of the base to define an interior within which the electronic component(s) are received and protected from the exterior environment. Regardless of the particular configuration of the module, the polymer composition of the present invention may be used to form all or a portion of the housing and/or cover. In one embodiment, for instance, the polymer composition of the present invention may be used to form the base and sidewall of the housing. In such embodiments, the cover may be formed from the polymer composition of the present invention or from a different material, such as a metal component (e.g., aluminum plate). Notably, one benefit of the present invention is that the polymer composition has a coefficient of linear thermal expansion that is similar to typical metal components used in electronic modules. For example, the coefficient of linear thermal expansion of the polymer composition may range from about 10 µm/m° C. to about 35 µm/m° C., in some embodiments from about 12 µm/m° C. to about 32 µm/m° C., and in some embodiments, from 15 µm/m° C. to about 30 µm/m° C., as determined in accordance with ISO 11359-2:1999 in the flow direction (parallel). Further, the ratio of the coefficient of linear thermal expansion of the polymer composition to the coefficient of linear thermal expansion of the metal component may be from about 0.5 to about 1.5, in some embodiments from about 0.6 to about 1.2, and in some embodiments, from about 0.6 to about 1.0. For example, the coefficient of linear thermal expansion of aluminum is about 21 to 24 µm/m° C.

Figure 3:
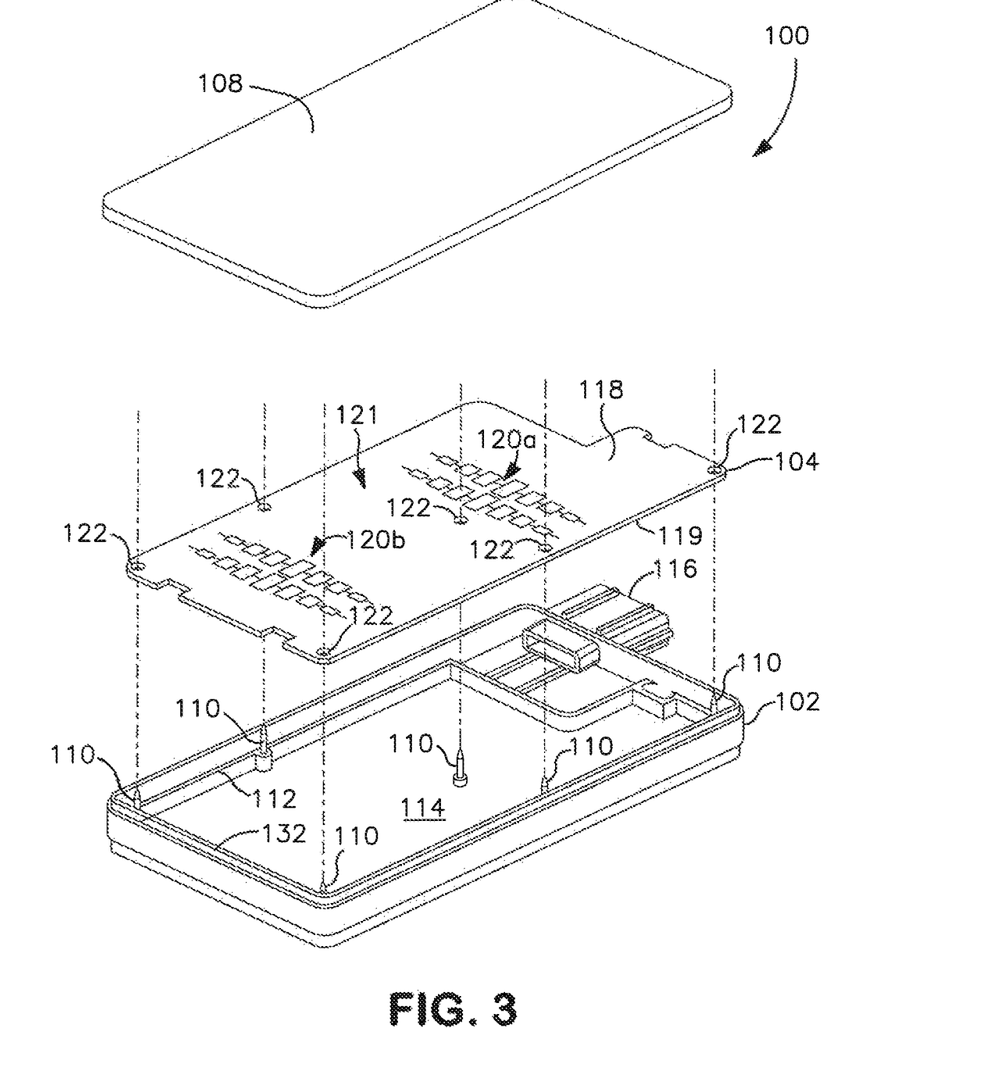
FIG. 3 is an exploded perspective view of one embodiment of an electronic module that may employ the polymer composition of the present invention.

Referring to FIG. 3, for instance, one particular embodiment of an electronic module 100 is shown that may incorporate the polymer composition of the present invention. The electronic module 100 includes a housing 102 that contains sidewalls 132 extending from a base 114. If desired, the housing 102 may also contain a shroud 116 that can accommodate an electrical connector (not shown). Regardless, a printed circuit board ("PCB") is received within the interior of the module 100 and attached to housing 102. More particularly, the circuit board 104 contains holes 122 that are aligned with and receive posts 110 located on the housing 102. The circuit board 104 has a first surface 118 on which electrical circuitry 121 is provided to enable radio frequency operation of the module 100. For example, the RF circuitry 121 can include one or more antenna elements 120a and 120b. The circuit board 104 also has a second surface 119 that opposes the first surface 118 and may optionally contain other electrical components, such as components that enable the digital electronic operation of the module 100 (e.g., digital signal processors, semiconductor memories, input/output interface devices, etc.). Alternatively, such components may be provided on an additional printed circuit board. A cover 108 may also be employed that is disposed over the circuit board 104 and attached to the housing 102 (e.g., sidewall) through known techniques, such as by welding, adhesives, etc., to seal the electrical components within the interior. As indicated above, the polymer composition may be used to form all or a portion of the cover 108 and/or the housing 102.

The electronic module may be used in a wide variety of applications. For example, the electronic module may be employed in an automotive vehicle (e.g., electric vehicle). When used in automotive applications, for instance, the electronic module may be used to sense the positioning of the vehicle relative to one or more three-dimensional objects. In this regard, the module may contain radio frequency sensing components, light detection or optical components, cameras, antenna elements, etc., as well as combinations thereof. For example, the module may be a radio detection and ranging ("radar") module, light detection and ranging ("lidar") module, camera module, global positioning module, etc., or it may be an integrated module that combines two or more of these components. Such modules may thus employ a housing that receives one or more types of electronic components (e.g., printed circuit board, antenna elements, radio frequency sensing devices, sensors, light sensing and/or transmitting elements (e.g., fibers optics), cameras, global positioning devices, etc.). In one embodiment, for example, a lidar module may be formed that contains a fiber optic assembly for receiving and transmitting light pulses that is received within the interior of a housing/cover assembly in a manner similar to the embodiments discussed above. Similarly, a radar module typically contains one or more printed circuit boards having electrical components dedicated to handling radio frequency (RF) radar signals, digital signal processing tasks, etc.

The electronic module may also be employed in a 5G system. For example, the electronic module may be an antenna module, such as macrocells (base stations), small cells, microcells or repeaters (femtocells), etc. As used herein, "5G" generally refers to high speed data communication over radio frequency signals. 5G networks and systems are capable of communicating data at much faster rates than previous generations of data communication standards (e.g., "4G, "LTE"). Various standards and specifications have been released quantifying the requirements of 5G communications. As one example, the International Telecommunications Union (ITU) released the International Mobile Telecommunications-2020 ("IMT-2020") standard in 2015. The IMT-2020 standard specifies various data transmission criteria (e.g., downlink and uplink data rate, latency, etc.) for 5G. The IMT-2020 Standard defines uplink and downlink peak data rates as the minimum data rates for uploading and downloading data that a 5G system must support. The IMT-2020 standard sets the downlink peak data rate requirement as 20 Gbit/s and the uplink peak data rate as 10 Gbit/s. As another example, $3^{rd}$ Generation Partnership Project (3GPP) recently released new standards for 5G, referred to as "5G NR." 3GPP published "Release 15" in 2018 defining "Phase 1" for standardization of 5G NR. 3GPP defines 5G frequency bands generally as "Frequency Range 1" (FR1) including sub-6 GHz frequencies and "Frequency Range 2" (FR2) as frequency bands ranging from 20-60 GHz. However, as used herein "5G frequencies" can refer to systems utilizing frequencies greater than 60 GHz, for example ranging up to 80 GHz, up to 150 GHz, and up to 300 GHz. As used herein, "5G frequencies" can refer to frequencies that are about 1.8 GHz or more, in some embodiments about 2.0 GHz or more, in some embodiments about 3.0 GHz or higher, in some embodiments from about 3 GHz to about 300 GHz, or higher, in some embodiments from about 4 GHz to about 80 GHz, in some embodiments from about 5 GHz to about 80 GHz, in some embodiments from about 20 GHz to about 80 GHz, and in some embodiments from about 28 GHz to about 60 GHz.

5G antenna systems generally employ high frequency antennas and antenna arrays for use in a 5G component, such as macrocells (base stations), small cells, microcells or repeaters (femtocell), etc., and/or other suitable components of 5G systems. The antenna elements/arrays and systems can satisfy or qualify as "5G" under standards released by 3GPP, such as Release 15 (2018), and/or the IMT-2020 Standard. To achieve such high speed data communication at high frequencies, antenna elements and arrays generally employ small feature sizes/spacing (e.g., fine pitch technology) that can improve antenna performance. For example, the feature size (spacing between antenna elements, width of antenna elements) etc. is generally dependent on the wavelength ("$\lambda$") of the desired transmission and/or reception radio frequency propagating through the substrate on which the antenna element is formed (e.g., $n\lambda/4$ where n is an integer). Further, beamforming and/or beam steering can be employed to facilitate receiving and transmitting across multiple frequency ranges or channels (e.g., multiple-in-multiple-out (MIMO), massive MIMO). The high frequency 5G antenna elements can have a variety of configurations. For example, the 5G antenna elements can be or include co-planar waveguide elements, patch arrays (e.g., mesh-grid patch arrays), other suitable 5G antenna configurations. The antenna elements can be configured to provide MIMO, massive MIMO functionality, beam steering, etc. As used herein "massive" MIMO functionality generally refers to providing a large number transmission and receiving channels with an antenna array, for example 8 transmission (Tx) and 8 receive (Rx) channels (abbreviated as 8×8). Massive MIMO functionality may be provided with 8×8, 12×12, 16×16, 32×32, 64×64, or greater.

The antenna elements may be fabricated using a variety of manufacturing techniques. As one example, the antenna elements and/or associated elements (e.g., ground elements, feed lines, etc.) can employ fine pitch technology. Fine pitch technology generally refers to small or fine spacing between their components or leads. For example, feature dimensions and/or spacing between antenna elements (or between an antenna element and a ground plane) can be about 1,500 micrometers or less, in some embodiments 1,250 micrometers or less, in some embodiments 750 micrometers or less (e.g., center-to-center spacing of 1.5 mm or less), 650 micrometers or less, in some embodiments 550 micrometers or less, in some embodiments 450 micrometers or less, in some embodiments 350 micrometers or less, in some embodiments 250 micrometers or less, in some embodiments 150 micrometers or less, in some embodiments 100 micrometers or less, and in some embodiments 50 micrometers or less. However, it should be understood that feature sizes and/or spacings that are smaller and/or larger may also be employed. As a result of such small feature dimensions, antenna configurations and/or arrays can be achieved with a large number of antenna elements in a small footprint. For example, an antenna array can have an average antenna element concentration of greater than 1,000 antenna elements per square centimeter, in some embodiments greater than 2,000 antenna elements per square centimeter, in some embodiments greater than 3,000 antenna elements per square centimeter, in some embodiments greater than 4,000 antenna elements per square centimeter, in some embodiments greater than 6,000 antenna elements per square centimeter, and in some embodiments greater than about 8,000 antenna elements per square centimeter. Such compact arrangement of antenna elements can provide a greater number of channels for MIMO functionality per unit area of the antenna area. For example, the number of channels can correspond with (e.g., be equal to or proportional with) the number of antenna elements.

Figure 4:
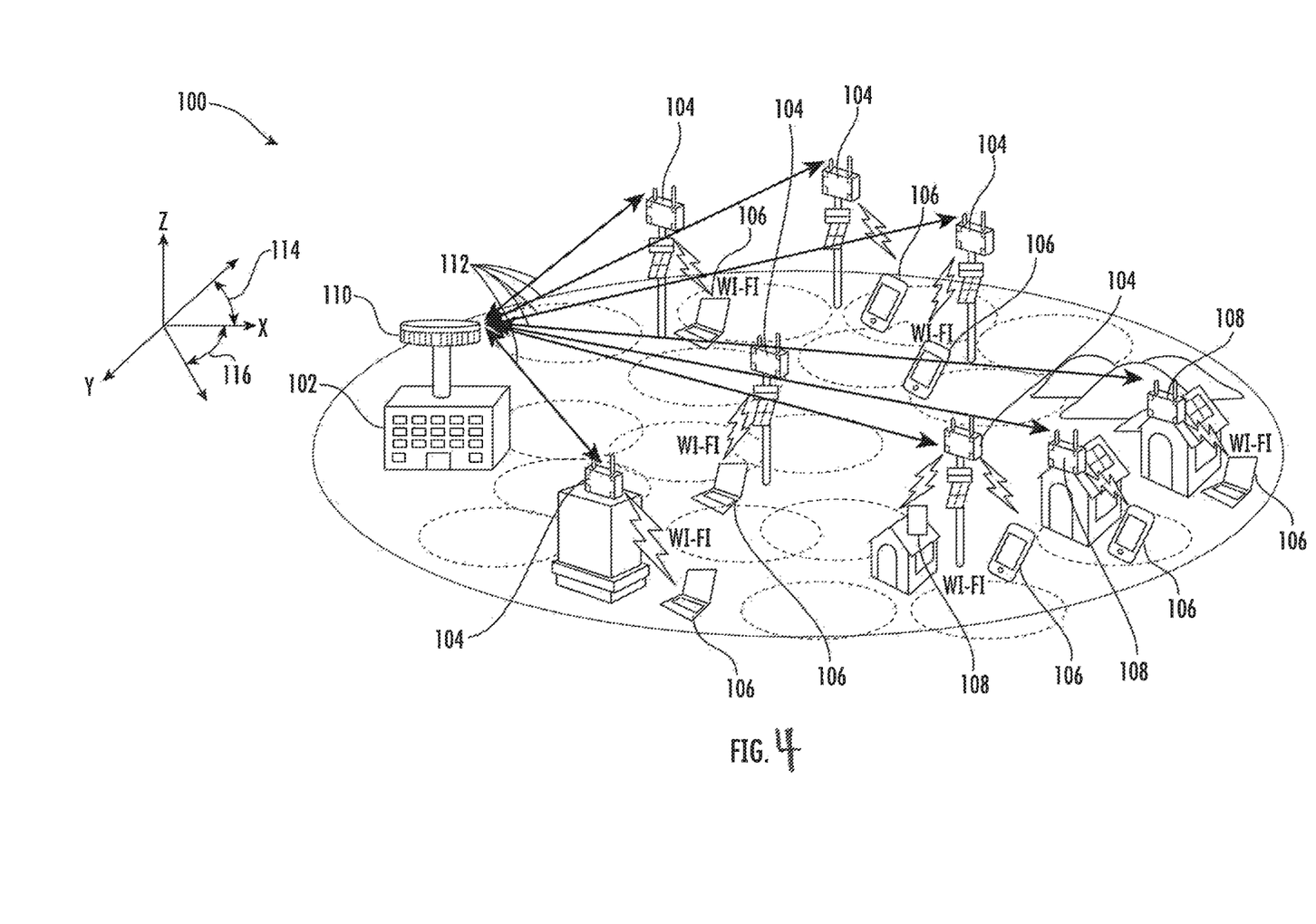
FIG. 4 depicts one embodiment of a 5G system that may employ an electronic module as shown in FIG. 3.

Referring to FIG. 4, for example, a 5G antenna system 100 can include a base station 102, one or more relay stations 104, one or more user computing devices 106, one or more Wi-Fi repeaters 108 (e.g., "femtocells"), and/or other suitable antenna components for the 5G antenna system 100. The relay stations 104 can be configured to facilitate communication with the base station 102 by the user computing devices 106 and/or other relay stations 104 by relaying or "repeating" signals between the base station 102 and the user computing devices 106 and/or relay stations 104. The base station 102 can include a MIMO antenna array 110 configured to receive and/or transmit radio frequency signals 112 with the relay station(s) 104, Wi-Fi repeaters 108, and/or directly with the user computing device(s) 106. The user computing device 306 is not necessarily limited by the present invention and include devices such as 5G smartphones. The MIMO antenna array 110 can employ beam steering to focus or direct radio frequency signals 112 with respect to the relay stations 104. For example, the MIMO antenna array 110 can be configured to adjust an elevation angle 114 with respect to an X-Y plane and/or a heading angle 116 defined in the Z-Y plane and with respect to the Z direction. Similarly, one or more of the relay stations 104, user computing devices 106, Wi-Fi repeaters 108 can employ beam steering to improve reception and/or transmission ability with respect to MIMO antenna array 110 by directionally tuning sensitivity and/or power transmission of the device 104, 106, 108 with respect to the MIMO antenna array 110 of the base station 102 (e.g., by adjusting one or both of a relative elevation angle and/or relative azimuth angle of the respective devices).

The present invention may be better understood with reference to the following examples.

TEST METHODS

Melt Flow Index: The melt flow index of a polymer or polymer composition may be determined in accordance with ISO 1133-1:2011 (technically equivalent to ASTM D1238-13) at a load of 2.16 kg and temperature of 230° C.

Tensile Modulus, Tensile Stress, and Tensile Elongation at Break: Tensile properties may be tested according to ISO Test No. 527-1:2019 (technically equivalent to ASTM D638-14). Modulus and strength measurements may be made on a dogbone-shaped test strip sample having a length of 170/190 mm, thickness of 4 mm, and width of 10 mm. The testing temperature may be −30° C., 23° C., or 80° C. and the testing speeds may be 1 or 5 mm/min.

Flexural Modulus, Flexural Elongation at Break, and Flexural Stress: Flexural properties may be tested according to ISO Test No. 178:2019 (technically equivalent to ASTM D790-17). This test may be performed on a 64 mm support span. Tests may be run on the center portions of uncut ISO 3167 multi-purpose bars. The testing temperature may be −30° C., 23° C., or 80° C. and the testing speed may be 2 mm/min.

Charpy Impact Strength: Charpy properties may be tested according to ISO Test No. ISO 179-1:2010) (technically equivalent to ASTM D256-10, Method B). This test may be run using a Type 1 specimen size (length of 80 mm, width of 10 mm, and thickness of 4 mm). Specimens may be cut from the center of a multi-purpose bar using a single tooth milling machine. The testing temperature may be −30° C., 23° C., or 80° C.

Deflection Temperature Under Load ("DTUL"): The deflection under load temperature may be determined in accordance with ISO Test No. 75-2:2013 (technically equivalent to ASTM D648-07). More particularly, a test strip sample having a length of 80 mm, width of 10 mm, and thickness of 4 mm may be subjected to an edgewise three-point bending test in which the specified load (maximum outer fibers stress) was 1.8 Megapascals. The specimen may be lowered into a silicone oil bath where the temperature is raised at 2° C. per minute until it deflects 0.25 mm (0.32 mm for ISO Test No. 75-2:2013).

Coefficient of Linear Thermal Expansion ("CLTE"): The coefficient of linear thermal expansion may be determined in accordance with ISO 11359 in the flow and/or transverse direction.

Dielectric Constant ("Dk") and Dissipation Factor ("Df"): The dielectric constant (or relative static permittivity) and dissipation factor (or loss tangent) are determined at a frequency of 2 GHz in accordance with IPC 650 Test Method No. 2.5.5.13 (1/07). According to this method, the in-plane dielectric constant and dissipation factor may be determined using a split-cylinder resonator. The tested sample had a thickness of 8.175 mm, width of 70 mm, and length of 70 mm.

Limiting Oxygen Index: The Limiting Oxygen Index ("LOI") may be determined by ISO 4589:2017 (technically equivalent to ASTM D2863-19). LOI is the minimum concentration of oxygen that will just support flaming combustion in a flowing mixture of oxygen and nitrogen. More particularly, a specimen may be positioned vertically in a transparent test column and a mixture of oxygen and nitrogen may be forced upward through the column. The specimen may be ignited at the top. The oxygen concentration may be adjusted until the specimen just supports combustion. The concentration reported is the volume percent of oxygen at which the specimen just supports combustion.

UL94: A specimen is supported in a vertical position and a flame is applied to the bottom of the specimen. The flame is applied for ten (10) seconds and then removed until flaming stops, at which time the flame is reapplied for another ten (10) seconds and then removed. Two (2) sets of five (5) specimens are tested. The sample size is a length of 125 mm, width of 13 mm, and thickness of 3 mm. The two sets are conditioned before and after aging. For unaged testing, each thickness is tested after conditioning for 48 hours at 23° C. and 50% relative humidity. For aged testing, five (5) samples of each thickness are tested after conditioning for 7 days at 70° C.

| Vertical Ratings | Requirements |
|---|---|
| V-0 | Specimens must not burn with flaming combustion for more than 10 seconds after either test flame application.<br>Total flaming combustion time must not exceed 50 seconds for each set of 5 specimens.<br>Specimens must not burn with flaming or glowing combustion up to the specimen holding clamp.<br>Specimens must not drip flaming particles that ignite the cotton.<br>No specimen can have glowing combustion remain for longer than 30 seconds after removal of the test flame. |
| V-1 | Specimens must not burn with flaming combustion for more than 30 seconds after either test flame application.<br>Total flaming combustion time must not exceed 250 seconds for each set of 5 specimens.<br>Specimens must not burn with flaming or glowing combustion up to the specimen holding clamp.<br>Specimens must not drip flaming particles that ignite the cotton.<br>No specimen can have glowing combustion remain for longer than 60 seconds after removal of the test flame. |
| V-2 | Specimens must not burn with flaming combustion for more than 30 seconds after either test flame application.<br>Total flaming combustion time must not exceed 250 seconds for each set of 5 specimens.<br>Specimens must not burn with flaming or glowing combustion up to the specimen holding clamp.<br>Specimens can drip flaming particles that ignite the cotton.<br>No specimen can have glowing combustion remain for longer than 60 seconds after removal of the test flame. |

EXAMPLE 1

A sample is formed that contains approximately 45 wt. % of a propylene homopolymer (melt flow index of 65 g/10 min, density of 0.90 g/cm$^3$), 35 wt. % of a flame retardant masterbatch, 20 wt. % continuous glass fiber rovings (2400 Tex, filament diameter of 16 μm), less than 5 wt. % of a coupling agent (maleic anhydride-grafted olefin polymer), and less than 2 wt. % heat/UV stabilizers. The flame retardant masterbatch contains 40 wt. % polypropylene and 60 wt. % of a halogen-free flame retardant system that includes a phosphorous-based flame retardant as described above. The sample is melt processed in a single screw extruder (90 mm) in which the melt temperature is 250° C., the die temperature is 250° C., and the zone temperatures range from 160° C. to 320° C., and the screw speed is 160 rpm.

EXAMPLE 2

A sample is formed that contains approximately 50 wt. % of a propylene homopolymer (melt flow index of 65 g/10 min, density of 0.90 g/cm$^3$), 30 wt. % of a flame retardant masterbatch as described in Example 1, 20 wt. % continuous glass fiber rovings (2400 Tex, filament diameter of 16 μm), less than 5 wt. % of a coupling agent (maleic anhydride-grafted olefin polymer), and less than 2 wt. % heat/UV stabilizers. The sample is melt processed in a single screw extruder (90 mm) in which the melt temperature is 250° C., the die temperature is 250° C., and the zone temperatures range from 160° C. to 320° C., and the screw speed is 160 rpm.

Samples of Examples 1-2 are tested for dielectric properties, mechanical properties, and flame retardancy. The results are set forth in the table below.

|  | Example 1 | Example 2 |
|---|---|---|
| Tensile Strength at 23° C. (MPa) | 91 | 90 |
| Flexural Strength at 23° C. (MPa) | 145 | 141 |
| Flexural Modulus at 23° C. (MPa) | 5,988 | 5,574 |
| Charpy Unnotched Impact Strength at 23° C. (kJ/m$^2$) | 48.8 | 49.6 |
| Flame Resistance at 3 mm (UL94) | V0 | V0 |
| Dielectric Constant at 2 GHz | 3.07 | 2.93 |
| Dissipation Factor at 2 GHz | 0.0024 | 0.0021 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A fiber-reinforced polymer composition comprising:
   from about 60 wt. % to about 90 wt. % of a polymer matrix that contains propylene polymer, wherein the propylene polymer comprises 30 wt. % to 65 wt. % of the fiber-reinforced polymer composition;
   from about 10 wt. % to about 40 wt. % of a plurality of long reinforcing fibers having a length of from about 1 to about 25 millimeters that are distributed within the polymer matrix, wherein the polymer composition exhibits a dielectric constant of about 4 or less and dissipation factor of about 0.01 or less at a frequency of 2 GHz, and further wherein the polymer composition exhibits a Charpy unnotched impact strength of about 20 KJ/m$^2$ or more as determined in accordance with ISO Test No. 179-1:2010 at a temperature of about 23° C., and a Limiting Oxygen Index of about 25 or more as determined in accordance with ISO 4589:2017.

2. The fiber-reinforced polymer composition of claim 1, wherein the polymer composition exhibits a V0 or V1 rating in accordance with UL94.

3. The fiber-reinforced polymer composition of claim 1, wherein the polymer composition exhibits a total flame time of about 250 seconds or less in accordance with UL94.

4. The fiber-reinforced polymer composition of claim 1, wherein the polymer composition exhibits a flexural strength of from about 100 to about 500 MPa as determined in accordance with ISO Test No. 178:2019 at a temperature of about 23° C.

5. The fiber-reinforced polymer composition of claim 1, wherein the polymer composition exhibits a Charpy unnotched impact strength of about 20 KJ/m$^2$ or more as determined in accordance with ISO Test No. 179-1:2010 at a temperature of about −40° C.

6. The fiber-reinforced polymer composition of claim 1, wherein the polymer composition exhibits a tensile strength of about 50 MPa or more as determined in accordance with ISO Test No. 527-1:2019 at a temperature of about 23° C.

7. The fiber-reinforced polymer composition of claim 1, wherein the polymer composition exhibits a tensile strength of about 50 MPa or more as determined in accordance with ISO Test No. 527-1:2019 at a temperature of about −40° C.

8. The fiber-reinforced polymer composition of claim 1, wherein the polymer composition further comprises a flame retardant system.

9. The fiber-reinforced polymer composition of claim 8, wherein the flame retardant system contains at least one halogen-free organophosphorous flame retardant.

10. The fiber-reinforced polymer composition of claim 9, wherein the organophosphorous flame retardant includes a nitrogen-containing phosphate salt.

11. The fiber-reinforced polymer composition of claim 10, wherein the phosphate salt includes a melamine phosphate salt, piperazine phosphate salt, or a combination thereof.

12. The fiber-reinforced polymer composition of claim 9, wherein the organophosphorous flame retardants include a phosphoric acid ester, phosphonic acid ester, phosphinic acid salt, phosphonate amine, phosphazene, or a combination thereof.

13. The fiber-reinforced polymer composition of claim 9, wherein organophosphorous flame retardants constitute from about 50 wt. % to about 99.5 wt. % of the flame retardant system.

14. The fiber-reinforced polymer composition of claim 1, wherein the polymer composition further comprises a stabilizer system.

15. The fiber-reinforced polymer composition of claim 14, wherein the stabilizer system includes a sterically hindered phenol antioxidant, phosphite antioxidant, thioester antioxidant, or a combination thereof.

16. The fiber-reinforced polymer composition of claim 14, wherein the stabilizer system includes a UV stabilizer.

17. The fiber-reinforced polymer composition of claim 1, wherein the fibers include glass fibers.

18. The fiber-reinforced polymer composition of claim 1, wherein the fibers are spaced apart and aligned in a substantially similar direction.

19. The fiber-reinforced polymer composition of claim 1, wherein the polymer composition exhibits a coefficient of linear thermal expansion of from about 10 μm/m° C. to about 35 μm/m° C.

20. An electronic module comprises a housing that receives at least one electric component, wherein the housing comprises the polymer composition of claim 1.

21. The electronic module of claim 20, wherein the polymer composition is positioned adjacent to a metal component.

22. The electronic module of claim 21, wherein the ratio of the coefficient of linear thermal expansion of the polymer composition to the coefficient of linear thermal expansion of the metal component is from about 0.5 to about 1.5.

23. The electronic module of claim 22, wherein the metal component includes aluminum.

24. The electronic module of claim 20, wherein the electronic component includes an antenna element configured to transmit and receive 5G radio frequency signals.

25. The electronic module of claim 20, wherein the electronic component includes a radio frequency sensing component.

26. The electronic module of claim 20, wherein the electronic component includes a fiber optic assembly for receiving and transmitting light pulses.

27. The electronic module of claim 20, wherein the electronic component includes a camera.

* * * * *